(12) United States Patent
Pike et al.

(10) Patent No.: US 11,188,309 B2
(45) Date of Patent: Nov. 30, 2021

(54) USER INTERFACE ENGINE FOR MINIAPP DEVELOPMENT

(71) Applicant: ADP, LLC, Roseland, NJ (US)

(72) Inventors: Yair Pike, New York, NY (US); Joseph Pirtle, New York, NY (US); Lohit Sarma, New York, NY (US); Harshita Daddala, New York, NY (US); Claire Casaregola, New York, NY (US); Lauren Miller, New York, NY (US); Christopher Fahey, New York, NY (US)

(73) Assignee: ADP, LLC, Roseland, NJ (US)

( * ) Notice: Subject to any disclaimer, the term of this patent is extended or adjusted under 35 U.S.C. 154(b) by 89 days.

(21) Appl. No.: 16/585,855

(22) Filed: Sep. 27, 2019

(65) Prior Publication Data

US 2021/0096829 A1   Apr. 1, 2021

(51) Int. Cl.
*G06F 9/44* (2018.01)
*G06F 8/34* (2018.01)
*G06F 3/0482* (2013.01)
*G06Q 10/06* (2012.01)

(52) U.S. Cl.
CPC ............. *G06F 8/34* (2013.01); *G06F 3/0482* (2013.01); *G06Q 10/0637* (2013.01)

(58) Field of Classification Search
CPC ...... G06F 8/34; G06F 3/0482; G06Q 10/0637
See application file for complete search history.

(56) References Cited

U.S. PATENT DOCUMENTS

| | | | |
|---|---|---|---|
| 6,321,230 B1* | 11/2001 | Joslin | G06Q 10/06 |
| 7,958,486 B2 | 6/2011 | Tsyganskiy et al. | |
| 8,856,737 B2 | 10/2014 | Kand et al. | |
| 2006/0059461 A1* | 3/2006 | Baker | G06F 8/34 717/113 |
| 2008/0134207 A1* | 6/2008 | Chamieh | G06F 9/4488 719/315 |
| 2014/0258894 A1 | 9/2014 | Brown et al. | |
| 2014/0258968 A1 | 9/2014 | Brown et al. | |
| 2019/0227855 A1* | 7/2019 | Beckett | G06F 9/541 |
| 2020/0042294 A1* | 2/2020 | Elango | G06F 3/04817 |

* cited by examiner

*Primary Examiner* — Chat C Do
*Assistant Examiner* — Lenin Paulino
(74) *Attorney, Agent, or Firm* — Yee & Associates, P.C.

(57) ABSTRACT

A method, computer system, and computer program product display a set of tiles within a first area of a graphical user interface. Each tile corresponds to a set of data nodes that are composable structured data objects according to a domain-specific language. A structured data object is composed from selected tiles and is displayed within a second area of the graphical user interface. Displaying the structured data object includes displaying a first tile and a second tile within a context of the structured data object. A value override is displayed at the first tile when a first value of the first set of data nodes is overridden by a second value of the second set of data nodes.

12 Claims, 21 Drawing Sheets

| | Tile: Everyones OKRs ✕ | Business Rule: ... |

<< Documents

Search a block 🔍

▼ OKR Management
  ▼ Tile: OKR_EveryonesOKRs
    ▼ Tiles
      OKR_SwitchCycles
      OKR_CreateOKR
    ▼ Picklists
      OKR_SourceTile
      CoreCycle_CycleStatus
      OKR_ParticipantType
    ▼ Shapes
      ▼ All Cycles
          CoreCycle_Cycle
      ▼ OKR-EveryonesOKRs
          OKR_EveryoneOKRListing
          OKR_EveryoneOKRListing.
    ▼ Business Rules
      OKR_ShowCycleIsLocked
      OKRMgmt_AssignmentLooku
      EveryonesOKRS_ResetSearc
      CycleStatus
      GetArrayLength
      Format Participant
      HideEveryoneOKR_IfEmpty
      DisablingButtonByCycleStatus
    ▼ Logiflows
      OKR_ExportOKR
    ▼ Required Grants
    ▼ Parameters
    ▼ Data Contracts
  ▼ Tile: OKR_CreateOKR
  ▼ Tile: OKR_AddCycle
  ▼ Tile: OKR_AssociateObjectives
  ▼ Tile: OKR_ConfigurationSettings Right panel:
🔍 ↶ ↷ 📋 🗑 ⊛

Ⓑ

🖱 Button: CreatePosition - "Create a..."

▼ 🔲 Section: sectionBody

▼ 🔲 Section: SectionContentHidden
    📅 DateTime: AsOfDateTime

▼ 🔲 Section: SectionContent (TD)
    ▼ ▭ Row: RowNoRecords
      ▼ 🔲 Section: newSection
        T Label: labelNoAddresses -

▼ ▯ Column: ColumnTypeSelector
      ≔ Picklist: Param_AddressType

▼ 🔳 Hotspot: hotspotPhysical
        T Label: labelPhysicalSelector -

▼ 🔳 Hotspot: hotspotMailing
        T Label: labelMailingSelector -

TO FIG. 9B

Console ⊗ 2 ⚠ 2 ⓘ 0 ▲ + 100 − Editing Mini App: OKR Management • Version: 2.3.5

<< Documents

Search a block

▼ OKR Management
　▼ Tile: OKR_EveryonesOKRs
　　▼ Tiles
　　　OKR_SwitchCycles
　　　OKR_CreateOKR
　　▼ Picklists
　　　OKR_SourceTile
　　　CoreCycle_CycleStatus
　　　OKR_ParticipantType
　　▼ Shapes
　　　▼ All Cycles
　　　　CoreCycle_Cycle
　　　▼ OKR-EveryonesOKRs
　　　　OKR_EveryoneOKRListing
　　　　OKR_EveryoneOKRListing.
　　▼ Business Rules
　　　OKR_ShowCycleIsLocked
　　　OKRMgmt_AssignmentLooku
　　　EveryonesOKRS_ResetSearc
　　　CycleStatus
　　　GetArrayLength
　　　Format Participant
　　　HideEveryoneOKR_IfEmpty
　　　DisablingButtonByCycleStatus
　　▼ Logiflows
　　　OKR_ExportOKR
　　▼ Required Grants
　　▼ Parameters
　　▼ Data Contracts
　▼ Tile: OKR_CreateOKR
　▼ Tile: OKR_AddCycle
　▼ Tile: OKR_AssociateObjectives
　▼ Tile: OKR_ConfigurationSettings Tile: Everyones OKRs ✕ | Business Rule: ...

Ⓑ

Button: CreatePosition - "Create a...

▼ Section: sectionBody
　▼ Section: SectionContentHidden
　　DateTime: AsOfDateTime

▼ Section: SectionContent (TD)
　▼ Row: RowNoRecords
　　▼ Section: newSection
　　　Label: labelNoAddresses -

▼ Column: ColumnTypeSelector
　　Picklist: Param_AddressType
　　▼ Hotspot: hotspotPhysical
　　　Label: labelPhysicalSelector -
　　▼ Hotspot: hotspotMailing
　　　Label: labelMailingSelector -

TO FIG. 10B

Console ⊗ 2 ⚠ 2 ⓘ 0 ▲  + 100 −  Editing Mini App: OKR Management • Version: 2.3.5

| | Tile: Everyones OKRs ✕ | Business Rule: ... |

<< Documents
Search a block 🔍

▼ OKR Management
  ▼ Tile: OKR_EveryonesOKRs
    ▼ Tiles
      OKR_SwitchCycles
      OKR_CreateOKR
    ▼ Picklists
      OKR_SourceTile
      CoreCycle_CycleStatus
      OKR_ParticipantType
    ▼ Shapes
      ▼ All Cycles
        CoreCycle_Cycle
      ▼ OKR-EveryonesOKRs
        OKR_EveryoneOKRListing
        OKR_EveryoneOKRListing.
    ▼ Business Rules
      OKR_ShowCycleIsLocked
      OKRMgmt_AssignmentLooku
      EveryonesOKRS_ResetSearc
      CycleStatus
      GetArrayLength
      Format Participant
      HideEveryoneOKR_IfEmpty
      DisablingButtonByCycleStatus
    ▼ Logiflows
      OKR_ExportOKR
    ▼ Required Grants
    ▼ Parameters
    ▼ Data Contracts
  ▼ Tile: OKR_CreateOKR
  ▼ Tile: OKR_AddCycle
  ▼ Tile: OKR_AssociateObjectives
  ▼ Tile: OKR_ConfigurationSettings ▼ 🗔 Section: SectionTitle
  ▼ ▯ Column: ColumnTitle
    ▼ 🗄 Data Repeater: DR...
      📅 DateTime: _record...

▼ 🗔 Section: sectionCurrent...
  ▼ ▯ Column: columnEmpty
    🆃 Label: labelSpace - 'I'

▼ 🗔 Section: sectionCountry
  ▼ ▯ Column: ColumnCountry
    🆃 Label: labelCountry -

▼ 🗔 Section: sectionAddressLine1
  ▼ ▯ Column: ColumnAddress1
    🆃 Label: labelAddressLine1 -

TO FIG. 12B

Console ⊗2 ⚠2 ⓘ0 ▲ | +100 − | Editing Mini App: OKR Management • Version: 2.3.5

| | Tile: Everyones OKRs ✕ | Business Rule: ... |

⟨⟨ Documents

Search a block 🔍

▼ OKR Management
  ▼ Tile: OKR_EveryonesOKRs
    ▼ Tiles
      OKR_SwitchCycles
      OKR_CreateOKR
    ▼ Picklists
      OKR_SourceTile
      CoreCycle_CycleStatus
      OKR_ParticipantType
    ▼ Shapes
      ▼ All Cycles
        CoreCycle_Cycle
      ▼ OKR-EveryonesOKRs
        OKR_EveryoneOKRListing
        OKR_EveryoneOKRListing.
    ▼ Business Rules
      OKR_ShowCycleIsLocked
      OKRMgmt_AssignmentLooku
      EveryonesOKRS_ResetSearc
      CycleStatus
      GetArrayLength
      Format Participant
      HideEveryoneOKR_IfEmpty
      DisablingButtonByCycleStatus
    ▼ Logiflows
      OKR_ExportOKR
    ▼ Required Grants
    ▼ Parameters
    ▼ Data Contracts
  ▼ Tile: OKR_CreateOKR
  ▼ Tile: OKR_AddCycle
  ▼ Tile: OKR_AssociateObjectives
  ▼ Tile: OKR_ConfigurationSettings Right panel (1316 — Show/Hide Overrides):

🔍 ↶ ↷ 📋 🗑 ⊘ — 1316

Show/Hide Overrides

⚡ Button: CreatePosition - "Create a..."

▼ 🗔 Section: sectionBody   706

▼ 🗔 Section: SectionContentHidden
    📅 DateTime: AsOfDateTime

▼ 🗔 Section: SectionContent
  ▼ ▭ Row: RowNoRecords
    (2) 🗔 Section: newSection
      T Label: labelNoAddresses -

▼ ▯ Column: ColumnTypeSelector
  ≡ Picklist: Param_AddressType
  ▼ □⁺ Hotspot: hotspotPhysical
    T Label: labelPhysicalSelector -
  ▼ □⁺ Hotspot: hotspotMailing
    T Label: labelMailingSelector -

TO FIG. 13B

Console ⊗ 2 ⚠ 2 ⓘ 0 ▲   + 100 −   Editing Mini App: OKR Management • Version: 2.3.5

FIG. 13B

...CycleStatus ✗ | Shape: OKR_AllOKRs ✗ | Logiflow: OKR_CreateNewOKR ✗ | + | Walter ▼

[{ } View Metadata]  [Test]  [▷ Preview]  [✓ Save]

Blocks   Properties   Overrides

TILE
[No Value 🔍]

▼ All

Intent
Intent Data Unavailable
②

Name
[newSection_1]

Caption
[[New Section]]

Description
[No Value ···]

Caption Underline
[False ▼]

Display Style
[Default ▼]

Read Only
[False ▼]

Visible
[True ▼]

Background Image
[↗ Accrual ···]

Padding Top
[Select ▼]

..."Position"      ⚠ 5  ⊗ 2  🔗 3

'NoAddresses'

'Physical Address History'

'Mailing Address History'

▼ 📄 Column: ColumnAdd
 ▼ 🗔 Section: SectionT
  ▼ 📄 Column: Colum
   ▼ 🗃 Data Repea
   📅 DateTime: _r ▼ 🗔 Section: SectionC
  ▼ 📄 Column: Colum
   T Label: labelS

• ⑂ Walter_Develop_LinkAlignment • Last saved by Jesse Smith on 8/23/2018 at 10:58AM

FROM FIG. 13A

USER INTERFACE ENGINE FOR MINIAPP DEVELOPMENT

BACKGROUND INFORMATION

1. Field

The present disclosure relates to methods and devices for creating special purpose computers whose hardware and programming enable transformation of a user interface and transformation of the function of a computer such that an untrained user may develop applications.

2. Background

Currently, when a new computer program is desired, a trained programmer uses one or more specialized computer languages to create code. The code instructs a computer to perform a desired function.

In most cases, even for simple programs, the programmer will have extensive training in order to write code that will be capable of creating the desired computer functionality. In the case of complex software, the programmer may need to develop an architecture for the computer program, and then write the code to implement the architecture. For a large project, an entire team of trained programmers may be needed to create the desired code.

Thus, the process of coding is complex, expensive, and, for some, individuals beyond their ability. For most individuals, the solution to providing a computer with a desired functionality is to purchase pre-programmed software to enable the desired functionality. For example, a user desiring to use a computer to perform business accounting may purchase an accounting program that provides a computer with the functionality of performing accounting procedures on the computer.

Nevertheless, a user may desire specialized functionality for the computer that is not currently for sale, or may desire to modify an existing program. However, unless that user is a trained programmer and is willing to expend the resources needed to code a new program, the user will not be able to use the desired specialized functionality on the computer.

SUMMARY

The illustrative embodiments provide for a method of composing a business rule. The method includes displaying, by a computer system, a set of tiles. Each tile corresponds to a set of data nodes that are composable structured data objects according to a domain-specific language. The set of tiles are displayed within a first area of a graphical user interface. The method further includes displaying, by the computer system, a structured data object composed from selected tiles within a second area of the graphical user interface. Displaying the structured data object includes displaying, in the second area of the graphical user interface, a first tile within a context of the structured data object. The first tile corresponds to a first set of data nodes. Displaying the structured data object includes displaying, in the second area of the graphical user interface, a second tile within the context of the structured data object. The second tile corresponds to a second set of data nodes. Displaying the structured data object includes displaying, in the second area of the graphical user interface, a value override at the first tile when a first value of the first set of data nodes is overridden by a second value of the second set of data nodes. The value override at the first tile includes an indication of the second tile.

The illustrative embodiments also provide for a non-transitory computer readable medium storing program code stored thereon. The program code includes code for displaying a set of tiles, each tile corresponding to a set of data nodes that are composable structured data objects according to a domain-specific language. The set of tiles are displayed within a first area of a graphical user interface. The program code includes code for displaying a structured data object composed from selected tiles within a second area of the graphical user interface. The program code for displaying the structured data object includes code for displaying, in the second area of the graphical user interface, a first tile within a context of the structured data object. The first tile corresponds to a first set of data nodes. The program code for displaying the structured data object includes code for displaying, in the second area of the graphical user interface, a second tile within the context of the structured data object. The second tile corresponds to a second set of data nodes. The program code for displaying the structured data object includes code for displaying, in the second area of the graphical user interface, a value override at the first tile when a first value of the first set of data nodes is overridden by a second value of the second set of data nodes. The value override at the first tile includes an indication of the second tile.

The illustrative embodiments provide for a computer system comprising a hardware processor and an integrated development environment in communication with the hardware processor. The integrated development environment is configured to display a set of tiles, each tile corresponding to a set of data nodes that are composable structured data objects according to a domain-specific language. The set of tiles are displayed within a first area of a graphical user interface. The integrated development environment is configured to display a structured data object composed from selected tiles within a second area of the graphical user interface. Displaying the structured data object includes displaying, in the second area of the graphical user interface, a first tile within a context of the structured data object. The first tile corresponds to a first set of data nodes. Displaying the structured data object includes displaying, in the second area of the graphical user interface, a second tile within the context of the structured data object. The second tile corresponds to a second set of data nodes. Displaying the structured data object includes displaying, in the second area of the graphical user interface, a value override at the first tile when a first value of the first set of data nodes is overridden by a second value of the second set of data nodes. The value override at the first tile includes an indication of the second tile.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 9A-9B are an illustration of a graphical user interface selecting a particular data node from a drop-down list in accordance with an illustrative embodiment; and FIGS. 10A-10B is an illustration of a graphical user interface is illustrated having appended a particular data node in accordance with an illustrative embodiment;

FIGS. 12A-12B is an second illustration of a flowchart for a process composing a business rule in accordance with an illustrative embodiment;

FIGS. 13A-13B is a third illustration of a flowchart for a process composing a business rule in accordance with an illustrative embodiment;

DETAILED DESCRIPTION

The illustrative embodiments recognize and take into account that it is desirable to have a user interface engine to orchestrate development of mini-apps within an enterprise development environment. User interface atomic components are the basis for mini-app development. The user interface engine architecture allows for rapid creation of user interface atomic components and allows for codeless integration with responsive and adaptive mobile and touch support.

The illustrative embodiments also recognize and take into account that binding of customer data to a user browser in a way that makes sense for all different developer use cases is a difficult and previously unsolved problem. Complicating this problem is the interaction of server side resources with the interface components in the browser that the user manipulates, as well as with business rules specified by a user. Thus, the illustrative embodiments recognize and take into account that while a user may perceive a codeless, seamless, and integrated application development experience, the underlying functionality of the user interface engine is highly complex in order to enable that user experience.

Figure 1:
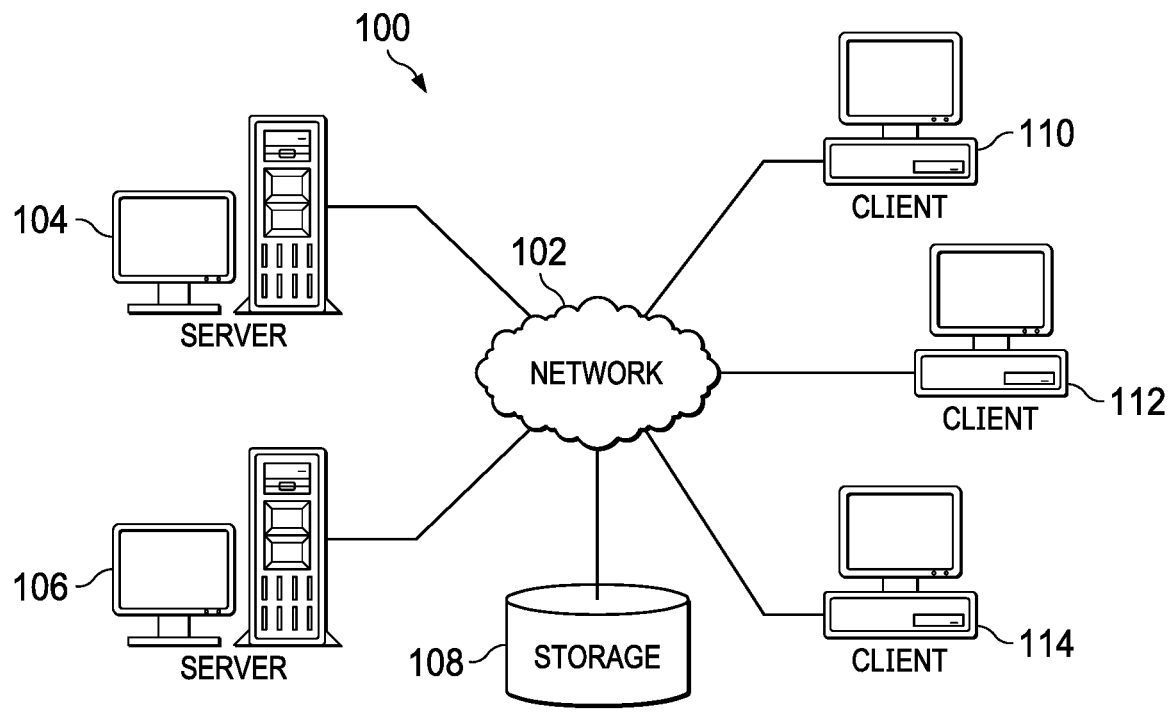
FIG. 1 is an illustration of a diagram of a data processing environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation, with regard to the environments in which the different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, and other suitable types of clients.

Figure 2:
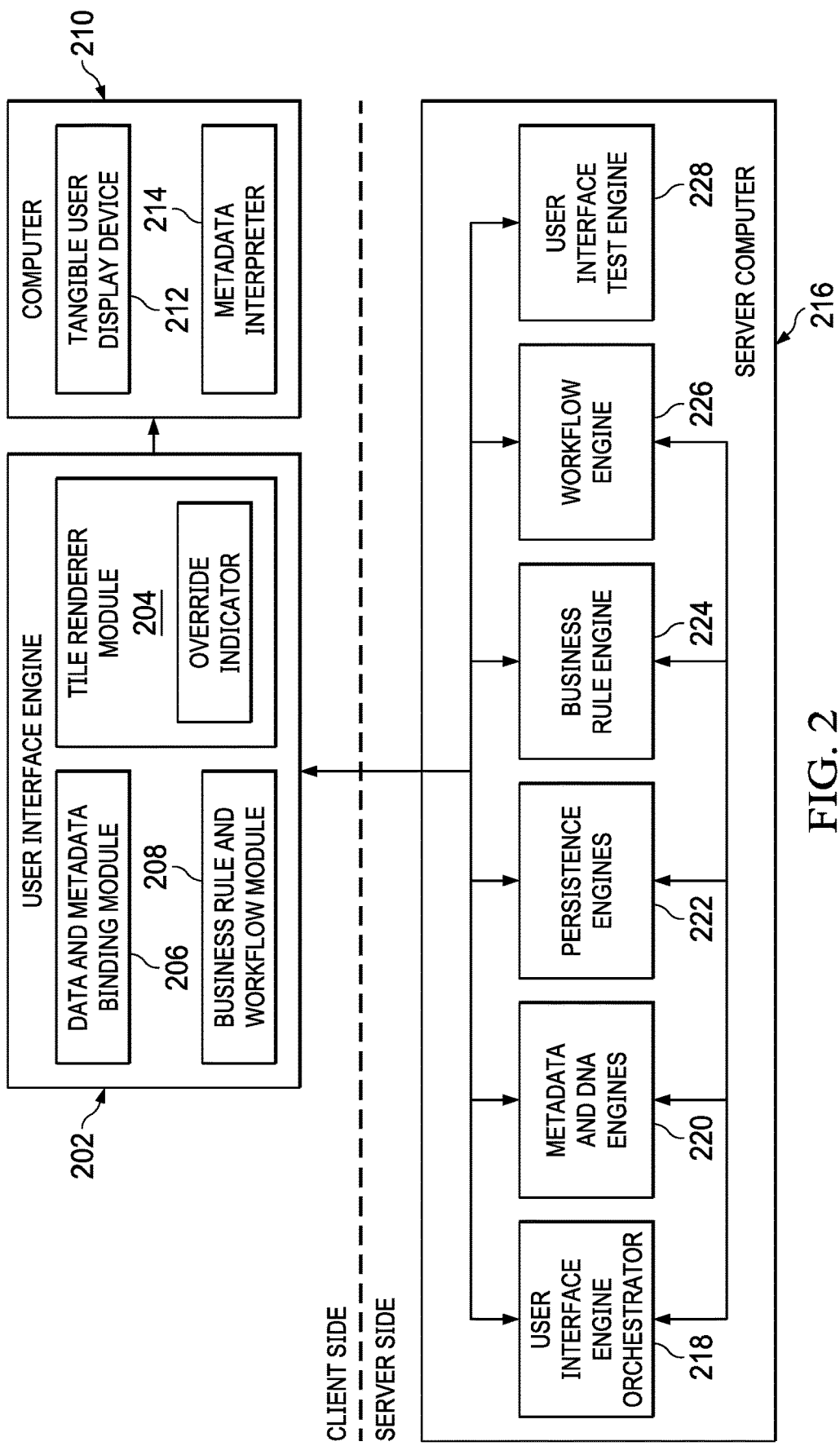
FIG. 2 is a block diagram illustrating an application development system for a domain-specific language entirely composed of structured data objects, in accordance with an illustrative embodiment.

FIG. 2 is a block diagram illustrating an application development system for a domain-specific language entirely composed of structured data objects depicted, in accordance with an illustrative embodiment. Application development system 200 may be used to manipulate composable data nodes to build at least one of business rules, mini-apps, and apps. Application development system 200 can be implemented in one or more of server computer 104, server computer 106, client computer 110, client computer 112, and client computer 114 of FIG. 1.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

User interface engine 202 is computer code, underlying data and structured data objects which provide underlying functionality and implementation capability for application designers using application development system 200. Primarily, user interface engine 202 operates client-side, meaning that user interface engine 202 operates on a specific client user's computer, such as one or more of client computer 110, client computer 112, and client computer 114 of FIG. 1. In one illustrative example, user interface engine 202 could be a web browser or an extension to a web browser.

Underlying the user interface, user interface engine 202 may include one or more modules. As depicted, user interface engine 202 includes tile renderer module 204, data and metadata binding module 206, and business rule and workflow module 208. Each module may be considered a collection of software or computer code which implements the functionality of the module.

Tile renderer module 204 is computer code which computer 210 may use to render tiles on tangible user display device 212. Tile renderer module 204 may receive input from the user, from data and metadata binding module 206, and from business rule and workflow module 208 to change and manipulate both the functionality of computer 210, which is used to execute tile renderer module 204, as well as tangible user display device 212, which is used to display rendered tiles.

Data and metadata binding module 206 is computer code which computer 210 may use to bind data and structured data objects to the user interface, possibly a browser, so that user interface engine 202 may keep track of all of the data and structured data objects used in executing business rules and workflows, as well as rendering tiles. Additional details regarding the functionality of data and structured data object binding module 206 is described below with respect to how data and structured data objects are used in user interface engine 202.

Business rule and workflow module 208 is computer code which computer 210 may use to create, join, merge, or otherwise manipulate composable data nodes in order to create mini-apps, collections, and bundles. Business rule and workflow module 208 is the underlying code which allows a user to create mini-apps, collections, and bundles without the user having to code any of the software being developed. Using data and structured data objects tracked by data and metadata binding module 206, the user can manipulate tiles rendered by tile renderer module 204. Business rule and workflow module 208 uses these composable data nodes, together with work flows and business rules to create the mini-apps, collections, or bundles in a user-perceived codeless development environment.

Metadata interpreter 214 is hardware or software which is used to interpret or execute business rules in a business system. Metadata interpreter 214 can be software residing in a web browser on computer 210. However, the illustrative embodiments are not necessarily limited to only client computers or web browsers.

Metadata interpreter 214 is a code interpreter designed for a domain-specific language entirely composed of structured data objects. In one illustrative example, metadata interpreter 214 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, metadata interpreter 214 executes the composition of structured data objects without compilation. Data node constructs are composed into well-defined structured data objects according to selected block types and properties, replacing the tokenization and parsing that would otherwise occur during compilation.

In some illustrative embodiments, user interface engine 202 may take advantage of some server side services operating on one or more server computers, such as server computer 216. "Server side" means that computer 210 communicates with server computer 216, possibly over a network such as the Internet. Server side resources are provided to support user interface engine 202. While not always necessary for implementation of user interface engine 202, server side resources can enhance the functionality of user interface engine 202.

For example, the server side resources may include user interface engine orchestrator 218. In some exemplary illustrative embodiments, user interface engine orchestrator 218 may be considered part of user interface engine 202 such that user interface engine 202 operates partially both on computer 210, but also on one or more server computers, such as server computer 216.

User interface engine orchestrator 218 may serve as a proxy to speed up processing of user interface engine 202. User interface engine orchestrator 218 may retrieve structured data objects and then identify whether data queries are for customer data, business rules, or any other structured data objects. User interface engine orchestrator 218 may then request such data, objects, or code, from the data center operating server side. User interface engine orchestrator 218 may cache retrieved data, structured data objects, code, workflows, or objects to be sent back to user interface engine 202.

Server side services may include other components other than user interface engine orchestrator 218. For example, server side resources could include one or more metadata and DNA engines 220, which can be used to manage or provide structured data objects for use in user interface engine 202. Server side resources may also include one or more persistence engines 222, which can be used to save work done using user interface engine 202. Server side resources may also include business rule engine 224, which may be used to create or store business rules that are used by user interface engine 202 in the user-perceived codeless building of mini-apps, collections, and bundles.

Server side resources may also include workflow engine 226, which may be used to create or store workflows that are used by user interface engine 202 in the user-perceived codeless building of mini-apps, collections, and bundles.

Server side resources may also include user interface test engine 228, which may be used to test both the functionality of user interface engine 202, possibly as well as the mini-apps, collections, and bundles created using user interface engine 202.

Figure 3:
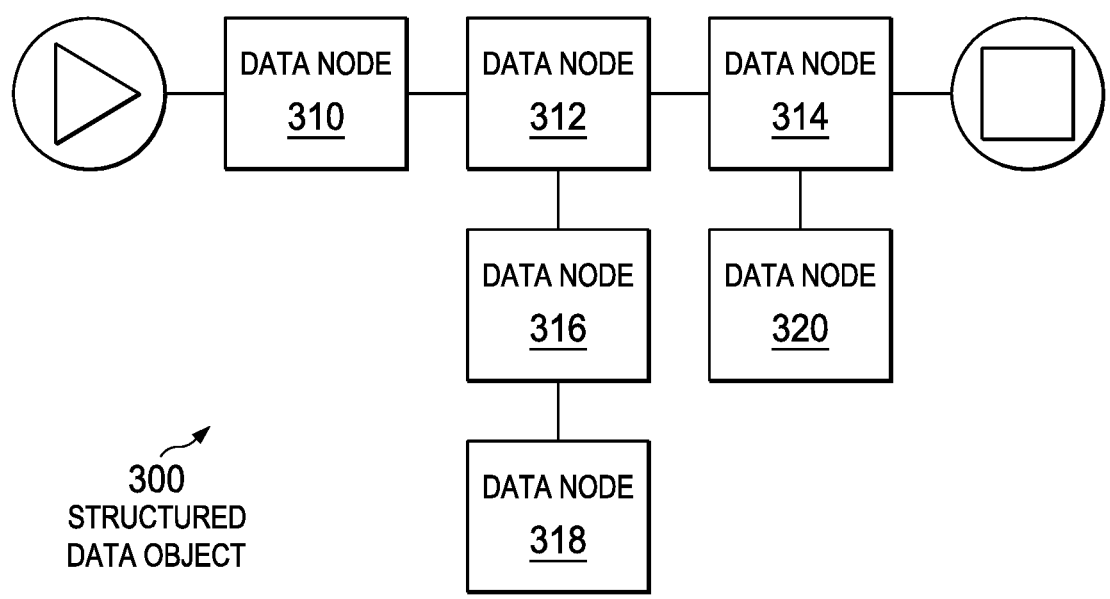
FIG. 3 an illustration of a block diagram of a structured data object in accordance with an illustrative embodiment.

With reference next to FIG. 3, an illustration of a block diagram of a structured data object is depicted in accordance with an illustrative embodiment. Structured data object 300 is an example of a composition of well-defined data nodes that can be linked together according to a domain-specific language to create mini-apps, collections, or bundles in a user-perceived codeless development environment, such as application development system 200 of FIG. 2.

Structured data object 300 includes data nodes 310, 312, and 314. Data nodes 310, 312, and 314 are well-defined structured data objects that can be manipulated within data and metadata binding module 206 of FIG. 2 to create desired business rules. Tile renderer module 204 of user interface engine 202 may visually present data nodes 310, 312, and 314, enabling the user to build different business rules, mini-apps and apps in application development system 200 of FIG. 2. Each of data nodes 310, 312, and 314 correlate to one or more functions, which in turn can be interpreted by metadata interpreter 214 of FIG. 2 for implementing the corresponding business rule. The different permutations of the compositions of these functions, as well as differentiated input, enable the execution of the different business rule behaviors at runtime.

The functions of data nodes 310, 312, and 314 operate inside of a context defined at the beginning of the business rule execution step, which is the target object for all symbols defined in the course of the business rule execution, as well as for all input to and output from the business rule itself. In this manner, data nodes 310, 312, and 314 act as a configuration object to the code being executed, defining an execution context (or scope being executed against) to other joined data nodes.

For example, structured data object 300 further includes data node 316. Data node 316 provides additional context for execution of related data node 312. Specifically, data node 316 may indicate that data node 312, as well as child data nodes thereof, should be interpreted within the context of data node 316.

Structured data object 300 further includes data node 318. Data node 318 provides additional context for execution of both related data node 312 and data node 316. For example, data node 318 may indicate that information required for execution of data node 312 should be requested and received from one or more web services. Data node 318 requests and returns the same context updated with the information received through the web services.

Structured data object 300 further includes business rule node 320. Business rule node 320 provides additional context for execution of related data node 314. Specifically, business rule node 320 may indicate a consuming service for receipt of business rule output provided by related data node 314. Business rule node 320 requests and returns information to a consuming service, such as a web page.

Figure 4:
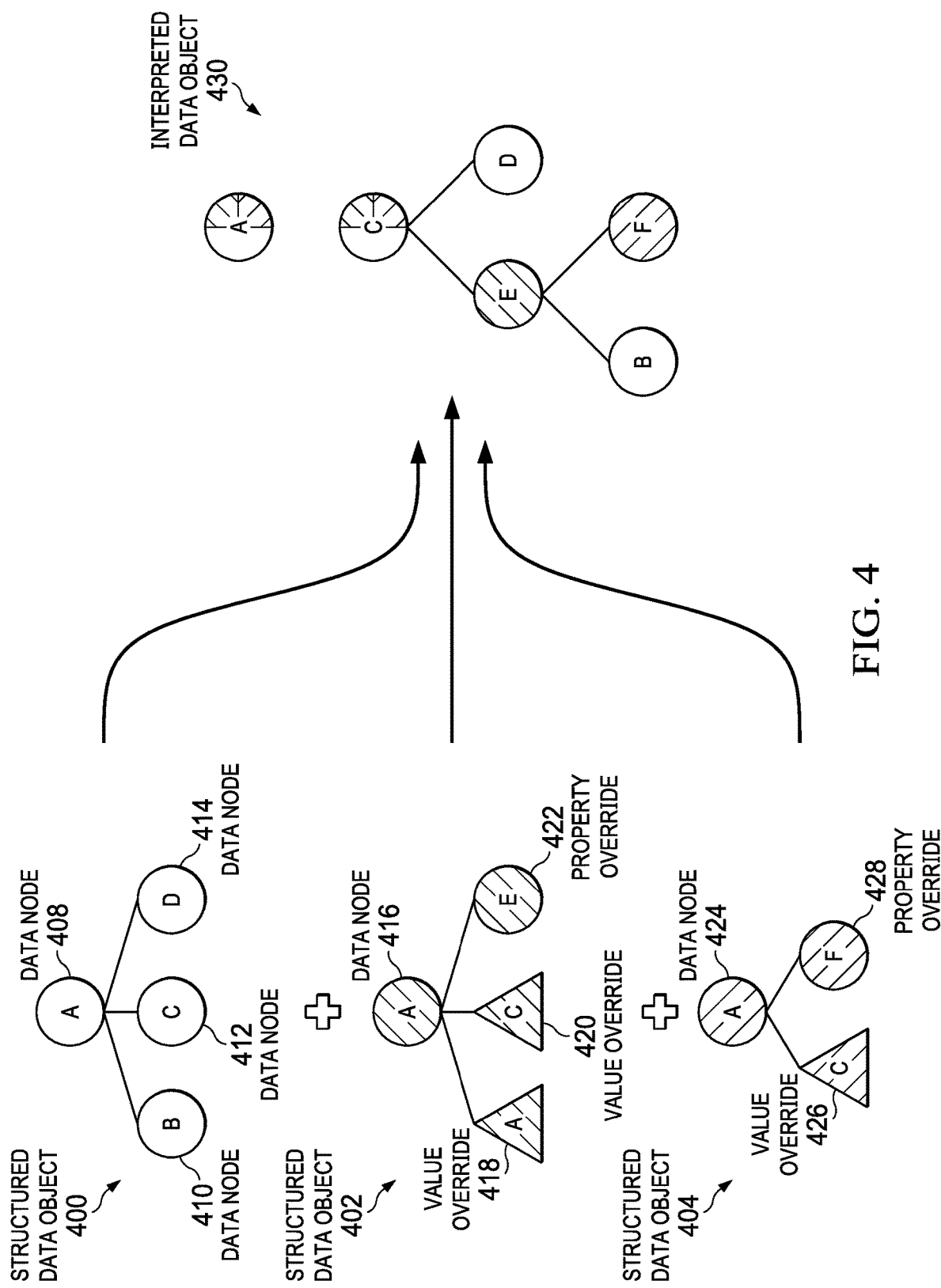
FIG. 4 is an illustration of a block diagram of an example of an operation of a user interface engine shown in FIG. 1 in accordance with an illustrative embodiment.

With reference next to FIG. 4, an illustration of a block diagram of structured data objects that apply number of overrides at design time is depicted in accordance with an illustrative embodiment. Each of structured data objects 400, 402, and 404 is an example of a structured data object, such as structured data object 300 of FIG. 3.

As depicted, structured data object 400 is a base level document, as indicated by data node 408. Structured data object 400 is a composition of data nodes 408, 410, 412, and 414 that are linked together according to a domain-specific language in a user-perceived codeless development environment, to create structured data object 400.

Structured data object 402 is an override document, as indicated by data node 416 that may be linked to structured data object 400 according to a domain-specific language in a user-perceived codeless development environment. During interpretation, structured data object 400 is interpreted in conjunction with structured data object 402, overriding one or more default values, properties, or combinations thereof, of the base level document. In an illustrative example, value overrides 418 and 420 respectively override one or more default values of data nodes 408 and 410 in the interpreted data object 430. Property override 422 appends additional nodes within the interpreted data object 430.

Structured data object 404 is an override document, as indicated by data node 424. Structured data object 404 can be linked to structured data object 400 according to a domain-specific language in a user-perceived codeless development environment. During interpretation, structured data objects 400 and 402 are interpreted in conjunction with structured data object 404 overriding one or more default values, properties, or combinations thereof, of the base level document. In an illustrative example, value override 426 overrides one or more default values of data node 412 in the interpreted data object 430. Property override 428 appends additional nodes within the interpreted data object 430.

Figure 5:
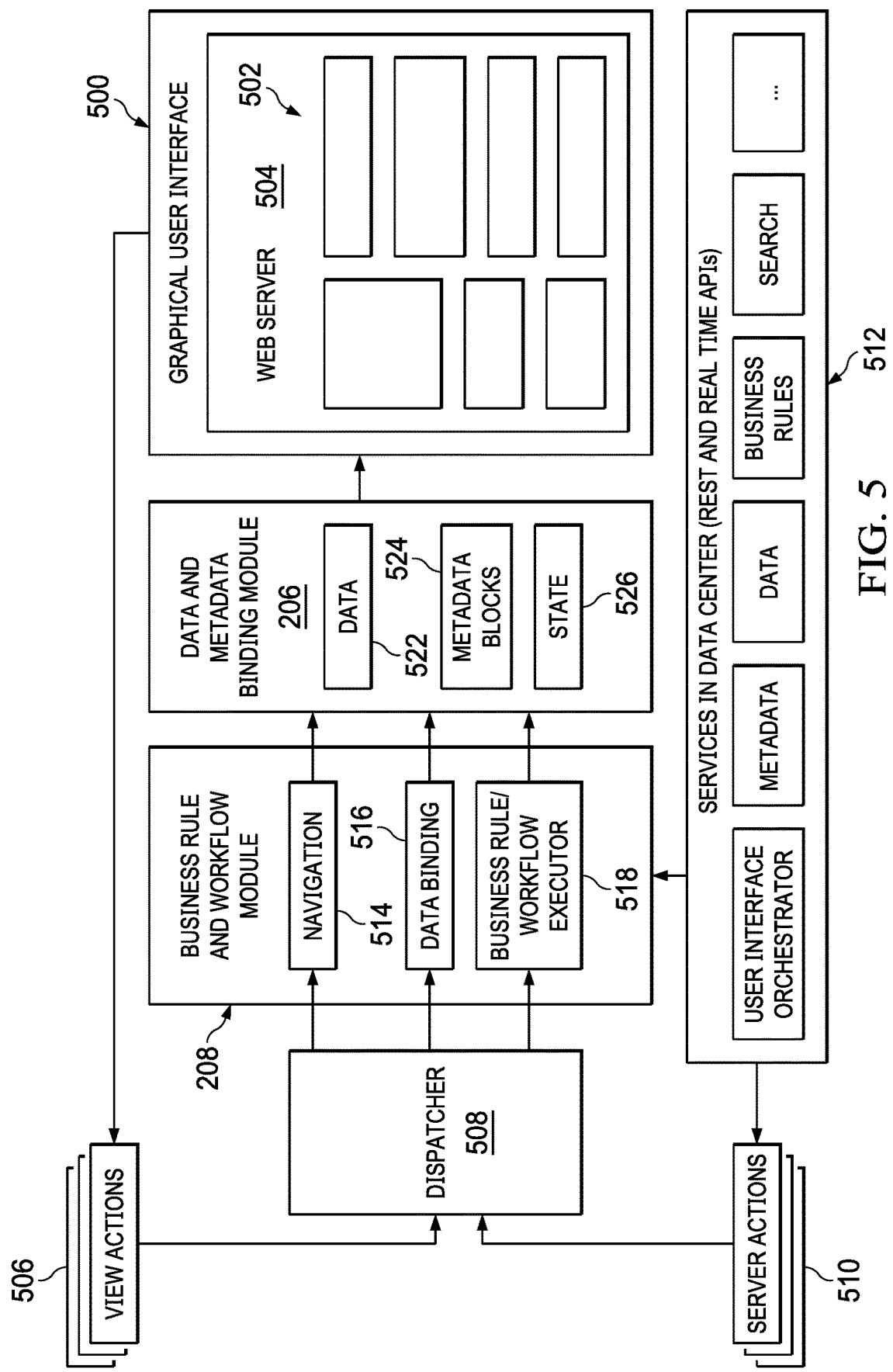
FIG. 5 is a block diagram of an example of an operation of a user interface engine shown in FIG. 2, in accordance with an illustrative embodiment.

FIG. 5 is an illustration of a block diagram of an example of an operation of a user interface engine shown in FIG. 2, in accordance with an illustrative embodiment. The example shown in FIG. 5 does not necessarily limit operation of user interface engine 202 as shown in FIG. 2. Nevertheless, FIG. 5 may be read in conjunction with FIG. 2.

In an illustrative embodiment, tile renderer module 204 in FIG. 2 may be used to generate graphical user interface 500. Graphical user interface 500 may take the form of tiles 502 shown in web browser 504. Each of tiles 502 may represent a building block. Alternatively, a tile may represent a mini-app, a collection, or even a bundle. Users may interact with graphical user interface 500, triggering, for example, a "view actions" command 506.

These actions are sent to dispatcher 508, which may be part of user interface engine 202, shown in FIG. 2. Dispatcher 508 may send the actions to the business rule and workflow module via subscriptions registered with dispatcher 508. Dispatcher 508 may also send server actions 510 sent by data center 512 to business rule and workflow module 208 in FIG. 2 for use in combination with the actions started by the user.

Business rule and workflow module 208 may run queries and apply business rules and other logic. Business rule and workflow module 208 may provide navigation 514, data binding 516, and execution by business rules and workflows executor 518.

Data and metadata binding module 206 in FIG. 2 may apply changes to user interface state 520 held in memory. User interface state 520 may be held in a tree structure containing data 522, metadata 524, and tile state 526. In turn, tile renderer module 204 in FIG. 2 may render graphical user interface 500. Tile renderer module 204 may listen to state changes in the tree structure and efficiently update only data 522 and metadata 524 that need re-rendering.

Graphical user interface 500 enables users with little or no background in computer software development to simply drag-and-drop files that contain prebuilt features onto a canvas and start building applications. However, as a user's efficiency progresses over time, this repetitive drag-and-drop interaction becomes a tedious process in application development in low-code development environments.

Figure 6:
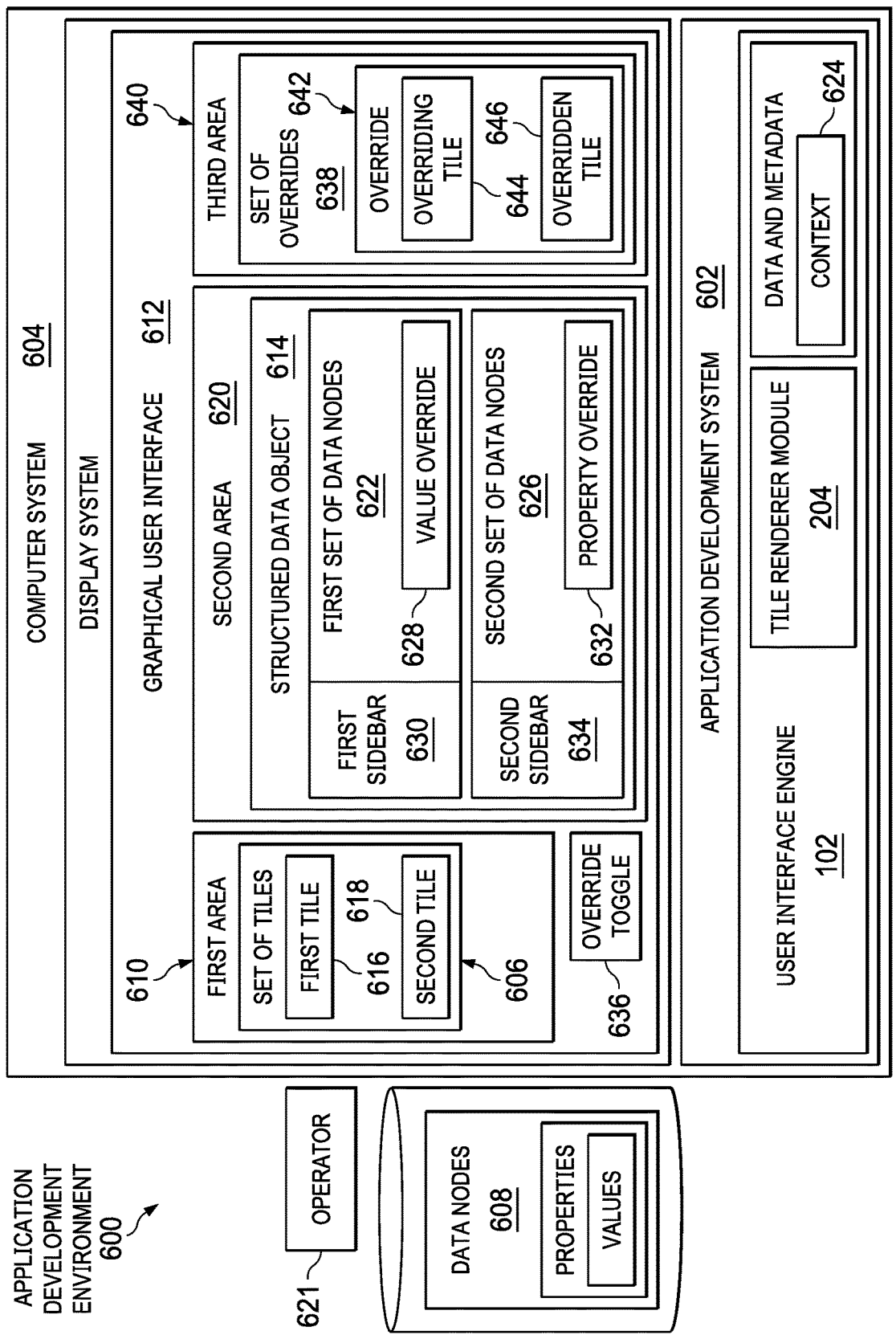
FIG. 6 is a block diagram of an application development environment in accordance with an illustrative embodiment.

With reference next to FIG. 6, a block diagram of an application development environment is depicted according to an illustrative example. Application development environment 600 includes application development system 602. Application development system 602 is an example of application development system 200 of FIG. 2. Application development system 602 can be implemented in computer system 604, which can be one or more of server computer 104, server computer 106, client computer 110, client computer 112, and client computer 114 of FIG. 1.

Application development system 602 may be implemented in software, hardware, firmware, or a combination thereof. When software is used, the operations performed by application development system 602 may be implemented in program code configured to run on hardware, such as a processor unit. When firmware is used, the operations performed by application development system 602 may be implemented in program code and data and stored in persistent memory to run on a processor unit. When hardware is employed, the hardware may include circuits that operate to perform the operations in application development system 602.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, application development system 602 displays set of tiles 606. Set of tiles 606 is an example of tiles 502 of FIG. 5, wherein each tile represents data node, mini-app, collection, or bundle. Each tile of set of tiles 606 corresponds to a different set of data nodes 608. Data node 608 are examples of data nodes such as data nodes 310-320 of FIG. 3. Data nodes 608 are composable into structured data objects, such as structured data object 300 of FIG. 3, according to a domain-specific language. Set of tiles 606 are displayed within a first area 610 of a graphical user interface 612.

Application development system 602 displays structured data object 614. Structured data object 614 is an example of structured data object 300 of FIG. 3. Structured data object 614 is composed from selected tiles, selected from a set of tiles 606. As depicted, structured data object 614 is composed of first tile 616 and second tile 618. Application development system 602 displays structured data object 614 in second area 620 of the graphical user interface 612.

In an illustrative example, displaying the structured data object 614 includes displaying a first set of data nodes 622 within a context 624 of the structured data object 614. First set of data nodes 622 corresponds to first tile 616.

Continuing with the current illustrative example, displaying the structured data object 614 also includes displaying second set of data nodes 626 within a context 624 of the structured data object 614. Second set of data nodes 626 corresponds to a second tile 618.

Continuing with the current illustrative example, displaying the structured data object 614 also includes displaying a value override 628 in association with the first set of data nodes 622 when a first value of the first set of data nodes 622 is overridden by a second value of the second set of data nodes 626, wherein the value override 628 at the first tile includes an indicator of the second tile 618.

In one illustrative example, displaying a structured data object 614 includes displaying the first set of data nodes 622 in association with first sidebar 630. Application development system 602 displays first sidebar 630, having a first color.

Continuing with the current illustrative example, displaying the structured data object 614 also includes determining when the second set 626 of data nodes appends additional properties to the first set of nodes 622. For example, second set of data nodes may be a contextual overrides, such as one of override structures, 404 or 406 of FIG. 4, that supersedes default properties of first set of data nodes 622. In this illustrative example, the second set of data nodes appends additional properties, in the form of one or more additional data nodes, to one or more of the first set of nodes 622. when the second set of data nodes 626 appends additional properties to the first set of nodes 622, application development system 602 displays property override 632 in association with the second set of data nodes 626. In one illustrative example, application development system 602 displays property override 632 in the form of second sidebar 634, having a second color. The second color of second sidebar 634 is different than the first color of first sidebar 630.

In one illustrative example, graphical user interface 612 includes override toggle 636. Override toggle 636 is a control element. As used herein, a control is a graphical and/or functional element that can be reused across graphical user interface (GUI) applications and which the user can select and activate to get additional information. A control, in a graphical user interface, is an object on the screen that can be manipulated by the user to perform some action.

Continuing with the current example, when user input is received that selects override toggle 636, application development system 602 removes the value override 628 from the second area of the graphical user interface 612. However, selection of the override toggle 636 control does not cause application development system 602 to remove the property override 632 from the second area 620 of the graphical user interface 612.

In one illustrative example, each of the data nodes displayed in second area 620 is also a control element which the user can select and activate to get additional information about the associated data node. For example, user input can be received that selects one of first set of data nodes 622 in the second area 620 of the graphical user interface 612. In response, application development system 602 displays set of overrides 638 applied to the selected one of first set of data nodes 622. Set of overrides 638 is displayed within a third area 640 of the graphical user interface 612. Override 642 is one of set of overrides 638.

As depicted, override 642 includes overriding tile 644 and overridden tile 646. Overriding tile 644 is an indication of which a set of tiles 606 is overriding overridden tile 646. Overriding tile 644 may include an indication of the superseding property or value. Overridden tile 646 is an indication of which a set of tiles 606 is being overridden by overriding tile 644. Overridden tile 646 may include an indication of the original property or value.

For example, when second set of data nodes 626 overrides one or more properties or values of first set of data nodes 622, overriding tile 644 can include an indication of second tiles 618, as well as the particular properties or values of second set of data nodes 626 that are overriding the properties or values of first set of data nodes 622. Overridden tile 606 can include an indication of first tile 616, as well as the particular properties or values of first set of data nodes 622 that are superseded by the properties or values of second set of data nodes 626.

In one illustrative example, user input can be received that selects one of set of override 638 in third area 640 of the graphical user interface 612. In response, application development system 602 focuses second area 620 of the graphical user interface 612 on a corresponding data node that includes the value for the selected override. For example, in response to receiving user input that selects override 642, application development system 602 focuses second area 620 on a corresponding one of second set of data nodes 626 that includes the value for override 642.

As a result, when implemented in a computer system, application development system 602 operates as a special purpose computer system in which integrated development environment 602 enables operator 621 to more quickly compose structured data object 614. Integrated development environment 602 enables operator 621 to more easily determine overriding properties and values as well as the tiles that are applying those overriding properties and values. Therefore, application development system 602 transforms a computer system into a special purpose computer system as compared to currently available general computer systems that do not have application development system 602.

Figure 7A:
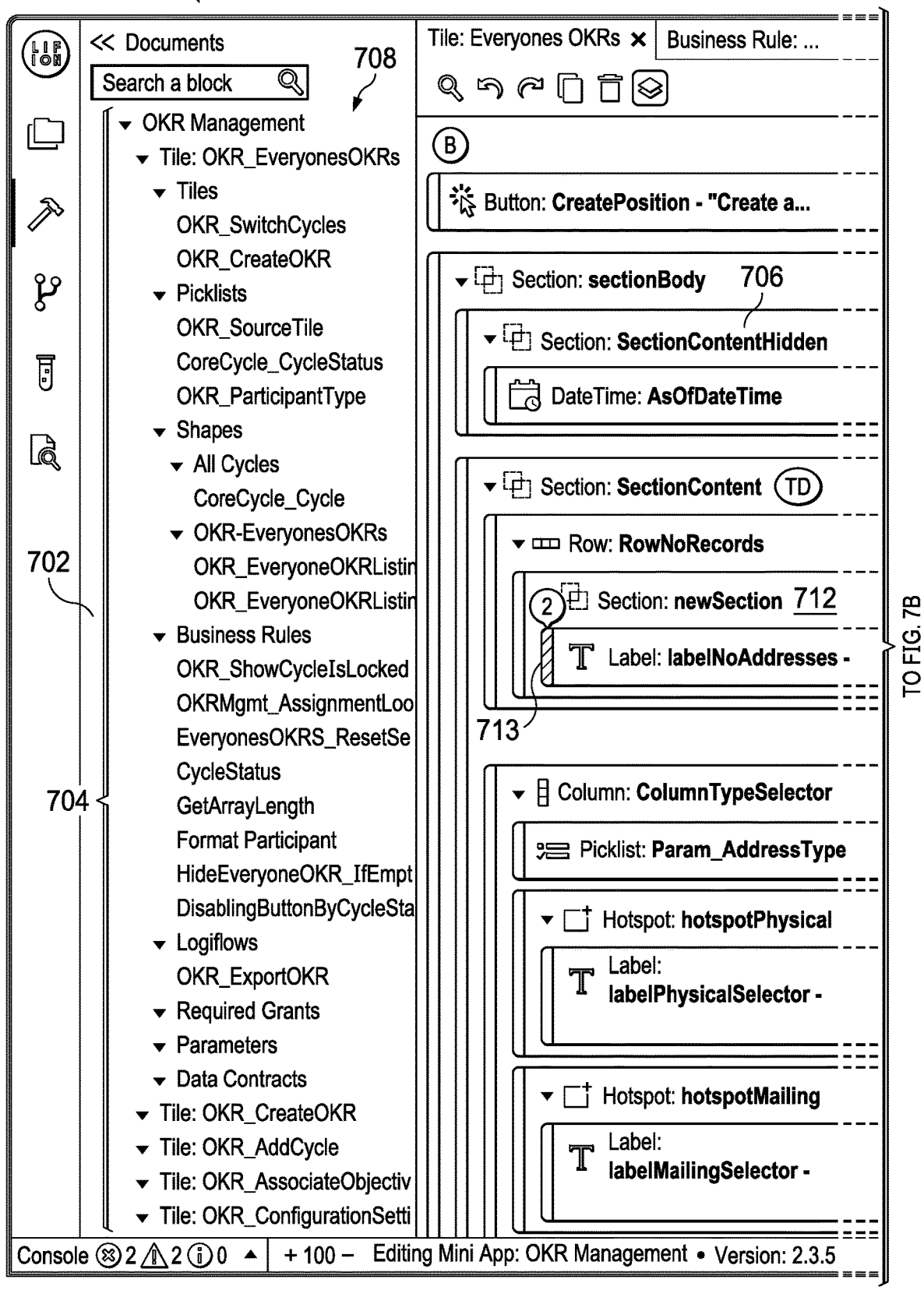
FIGS. 7A-7B are an illustration of a graphical user interface having a focus sent to a particular data node in accordance with an illustrative embodiment.
Figure 7B:
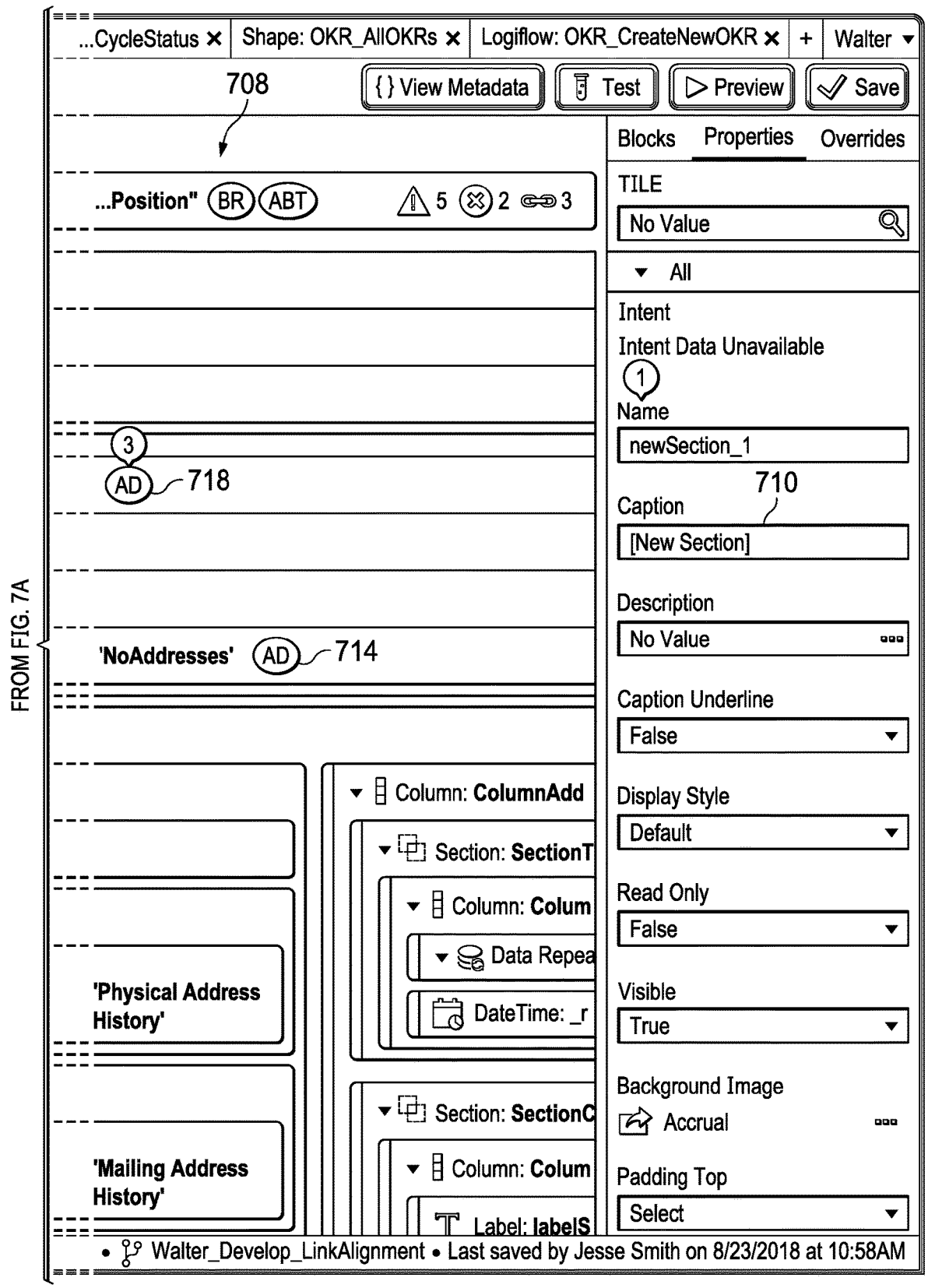

With reference next to FIG. 7, a graphical user interface for composing structured data objects according to a domain-specific language is depicted according to an illustrative example. Graphical user interface 700 is an example of graphical user interface 612 of FIG. 6.

As depicted, graphical user interface 700 includes a first area 702. First area 702 is an example of first area 610 of FIG. 6. First area 702 displays tiles 704. Tiles 704 is an example set of tiles 606, shown in block form in FIG. 6.

As depicted, graphical user interface 700 includes a second area 706. Second area 706 is an example of second area 620 of FIG. 6. Second area 706 displays a plurality of data nodes that have been linked together to form a structured data object 708 according to a domain-specific language. Dragging tiles from a first area 702 to second area 706 appends the corresponding set of data nodes into a structured data object 708 according to the domain-specific language.

As depicted, graphical user interface 700 includes third area 710. Third area 710 is an example of third area 640 of FIG. 6. Third area 710 displays properties and values for a data node selected from second area 706.

As depicted, third area 710 displays top-level document properties for structured data object 708. Top-level document properties can be displayed by default, such as, before a particular data node is selected from second area 706.

As depicted, second area 706 includes property override 710, indicating that an additional property has been appended to data node 712. In an illustrative example, Overriding by adding a new block is identified by sidebar 713 displayed using different color. Sidebar 713 is an example of second sidebar 634 of FIG. 6. Overriding by adding a new block may additionally be identified by a specific indication 714 of the tile that is making the override.

As depicted, second area 706 includes value override 716, indicating that a default value of data node 712 has been changed. In an illustrative example, Overriding by changing a value inside an existing block is identified by a specific indication 718 of the tile that is making the override.

Figure 8A:
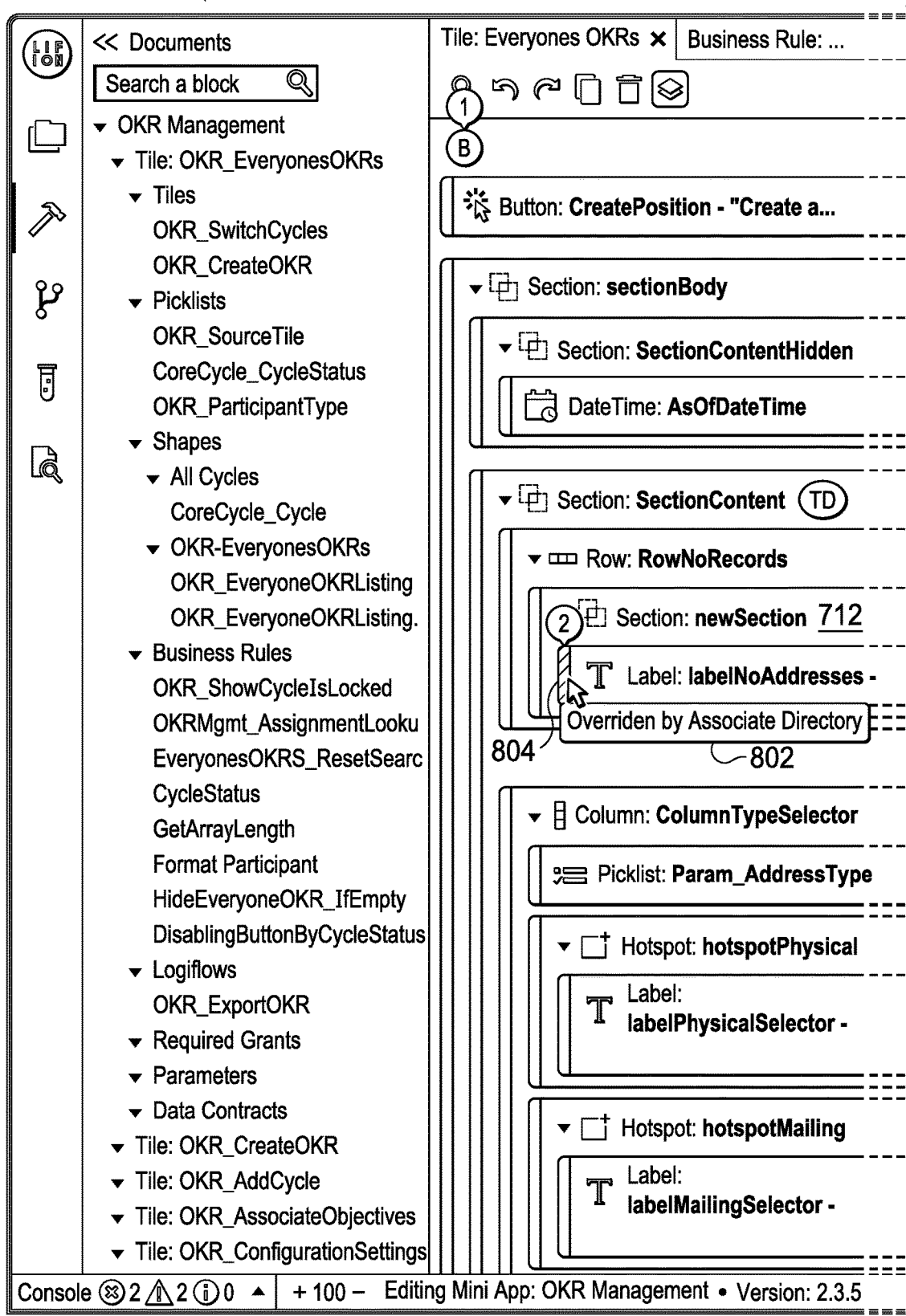
FIGS. 8A-8B are an illustration of a graphical user interface with a drop-down list in accordance with an illustrative embodiment.
Figure 8B:
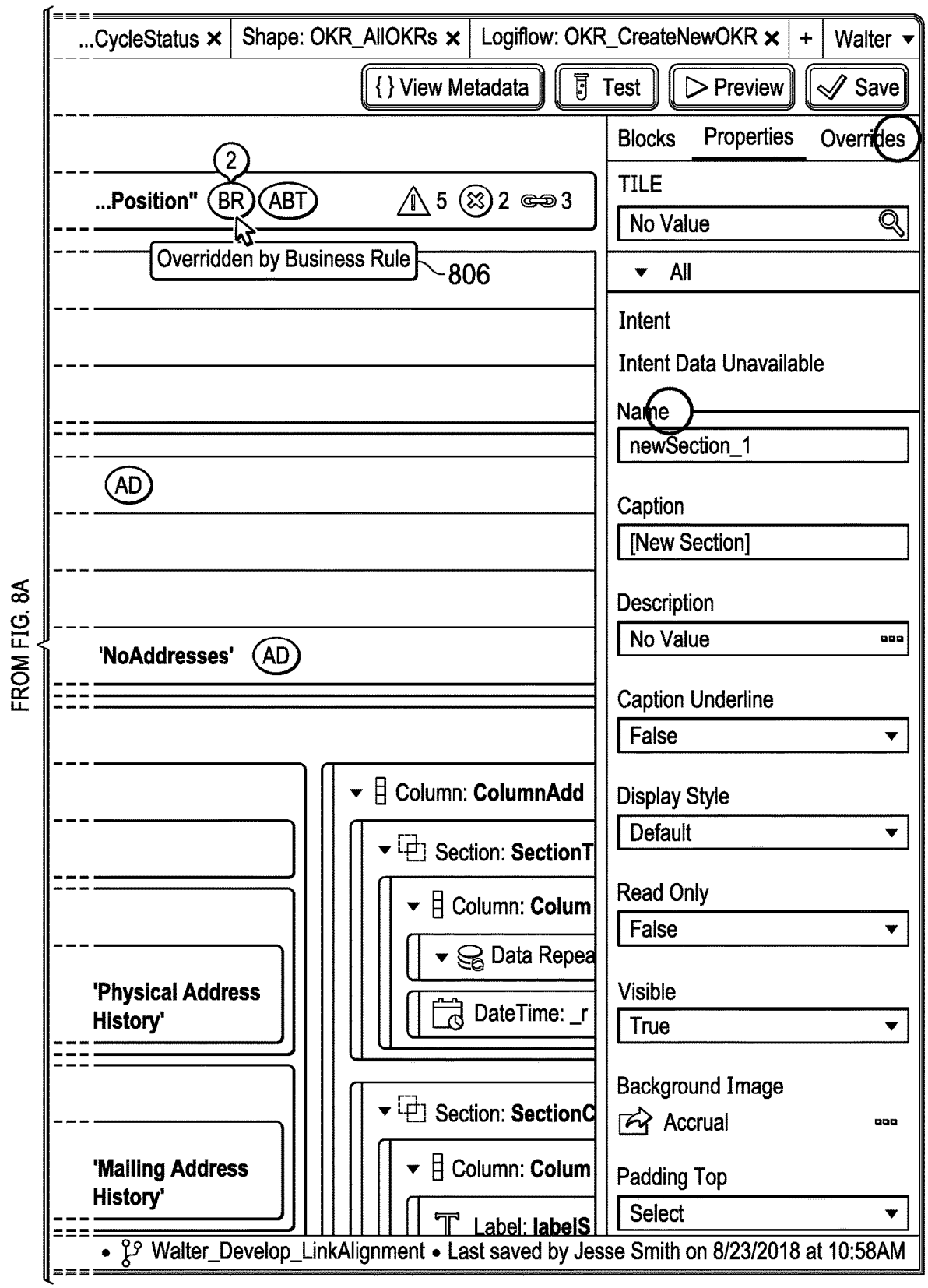

With reference next to FIG. 8, graphical user interface 700 is illustrated having a tooltip pop-up displayed in association with a particular data node according to an illustrative example. In an illustrative example, graphical user interface 700 displays pop-up 802 in response to receiving user input interacting with specific indicator 804. In an illustrative example, graphical user interface 700 displays pop-up 806 in response to receiving user input interacting with specific indicator 804. In one illustrative example, pop-ups 802 and 806 are displayed in response to user input that hovers a pointer the respective control.

Figure 9B:
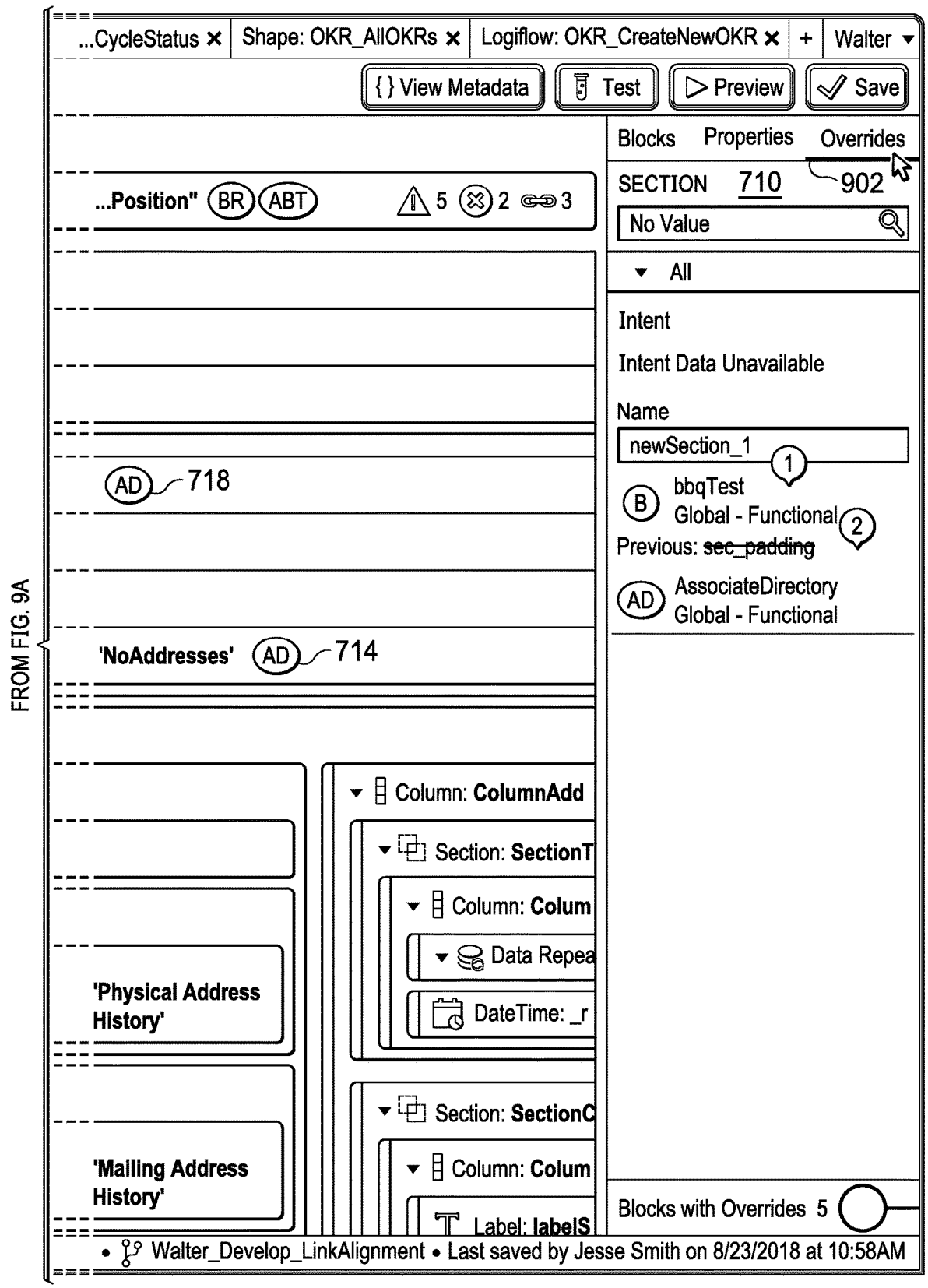

With reference next to FIG. 9, graphical user interface 700 is illustrated displaying properties and values for a selected data node according to an illustrative example. Responsive to user input that selects override tab 902, all overrides that are applied to a selected block are displayed in third area 710. In an illustrative example, corresponding overrides can be displayed in third area 710 in response to user input selecting a particular specific indication, such as specific indicator 714 or 718. As depicted, each override displayed in third area 710 includes an indication of the overriding tile, the overridden tile, and the affected properties and values.

Figure 10B:
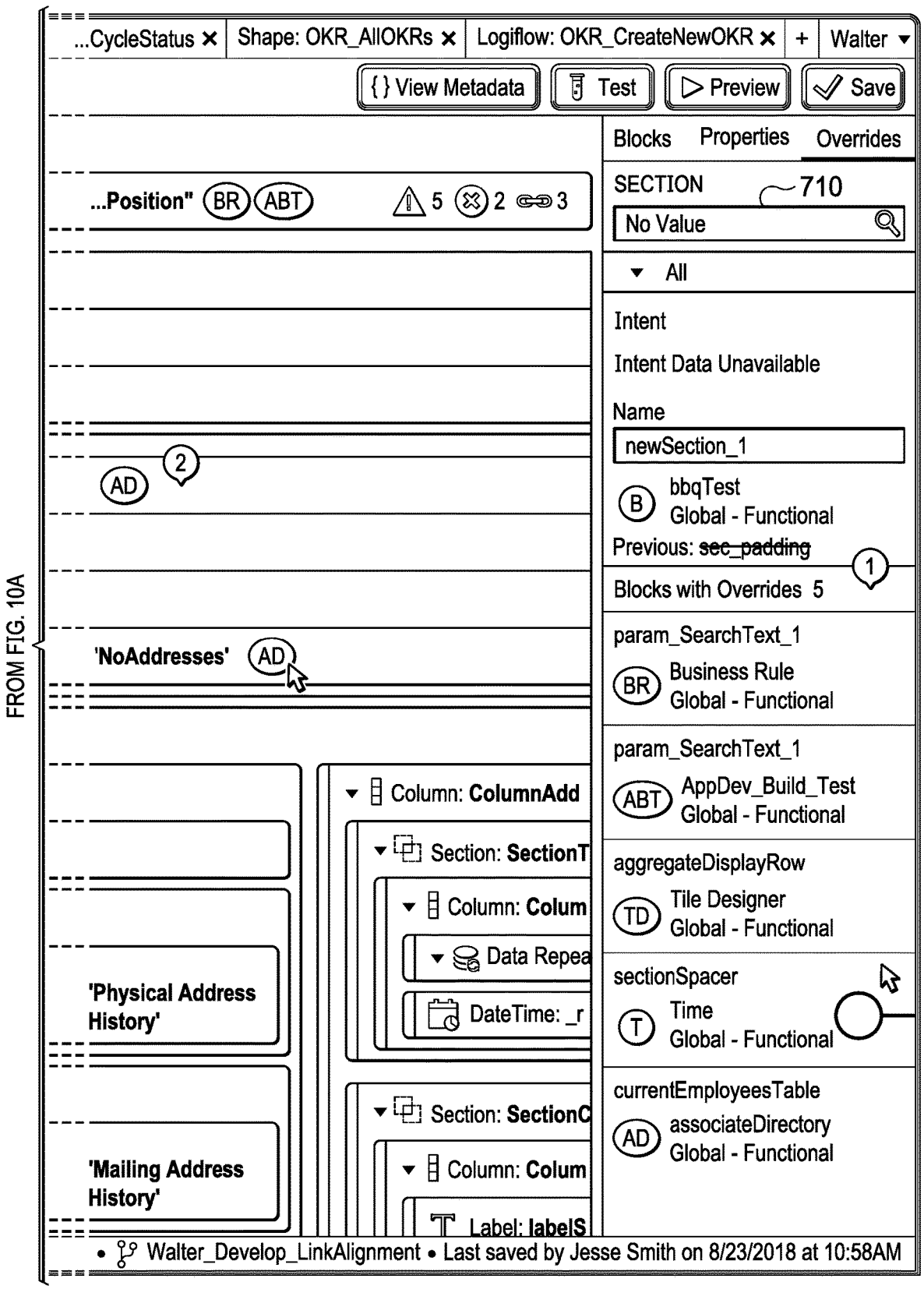

With reference next to FIG. 10, graphical user interface 700 is illustrated displaying overridden blocks according to an illustrative example. Responsive to user input that selects an overridden tile from third area 710, graphical user interface subdivides third area 710 to display a list of all sub-blocks with overrides. Each override includes the name of the tile that is overriding the block, as well as the overriding property or value. As depicted, multiple tiles that are overriding a particular block are listed separately.

Figure 11A:
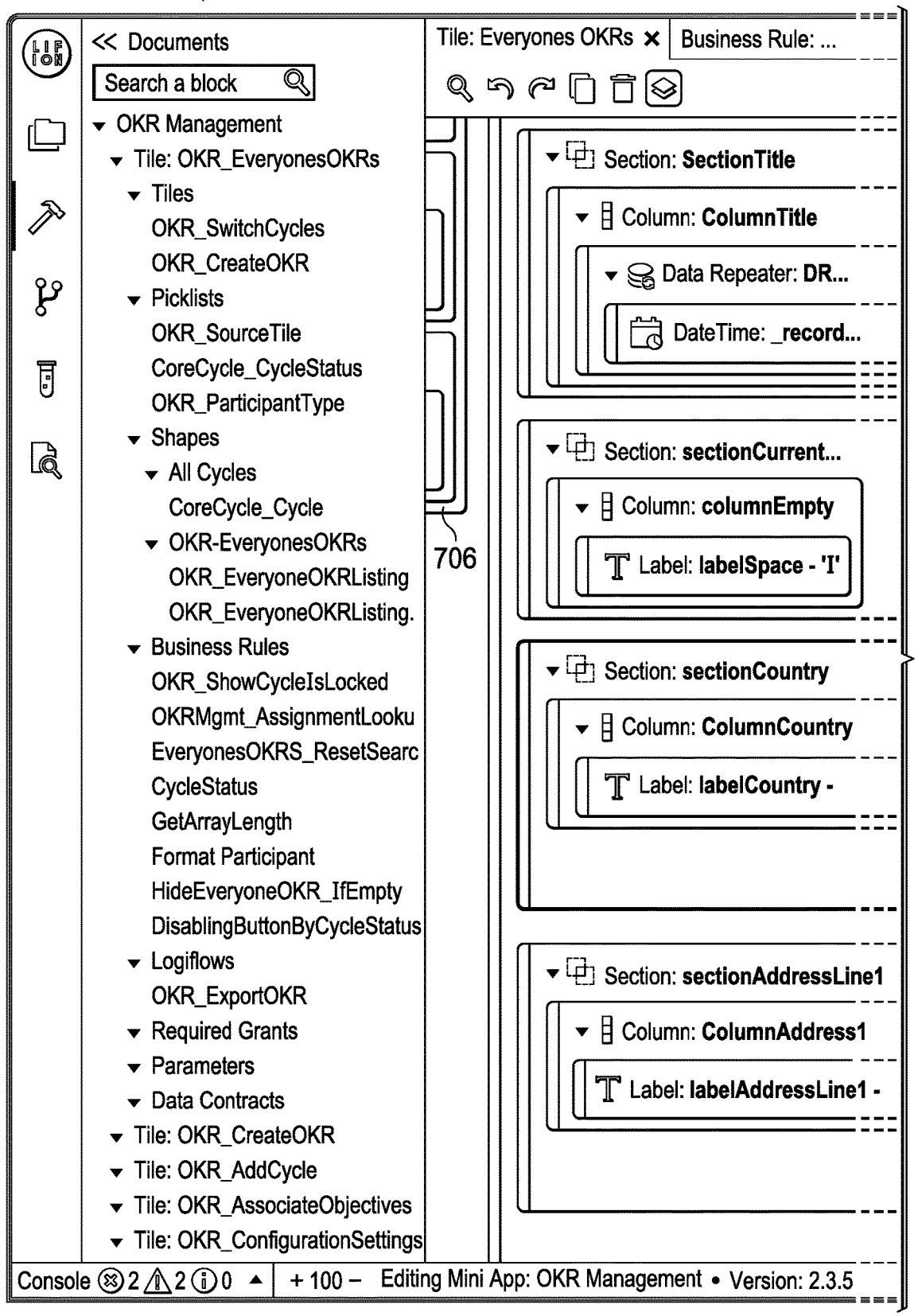
FIGS. 11A-11B are an illustration of a flowchart for a process composing a business rule in accordance with an illustrative embodiment.
Figure 11B:
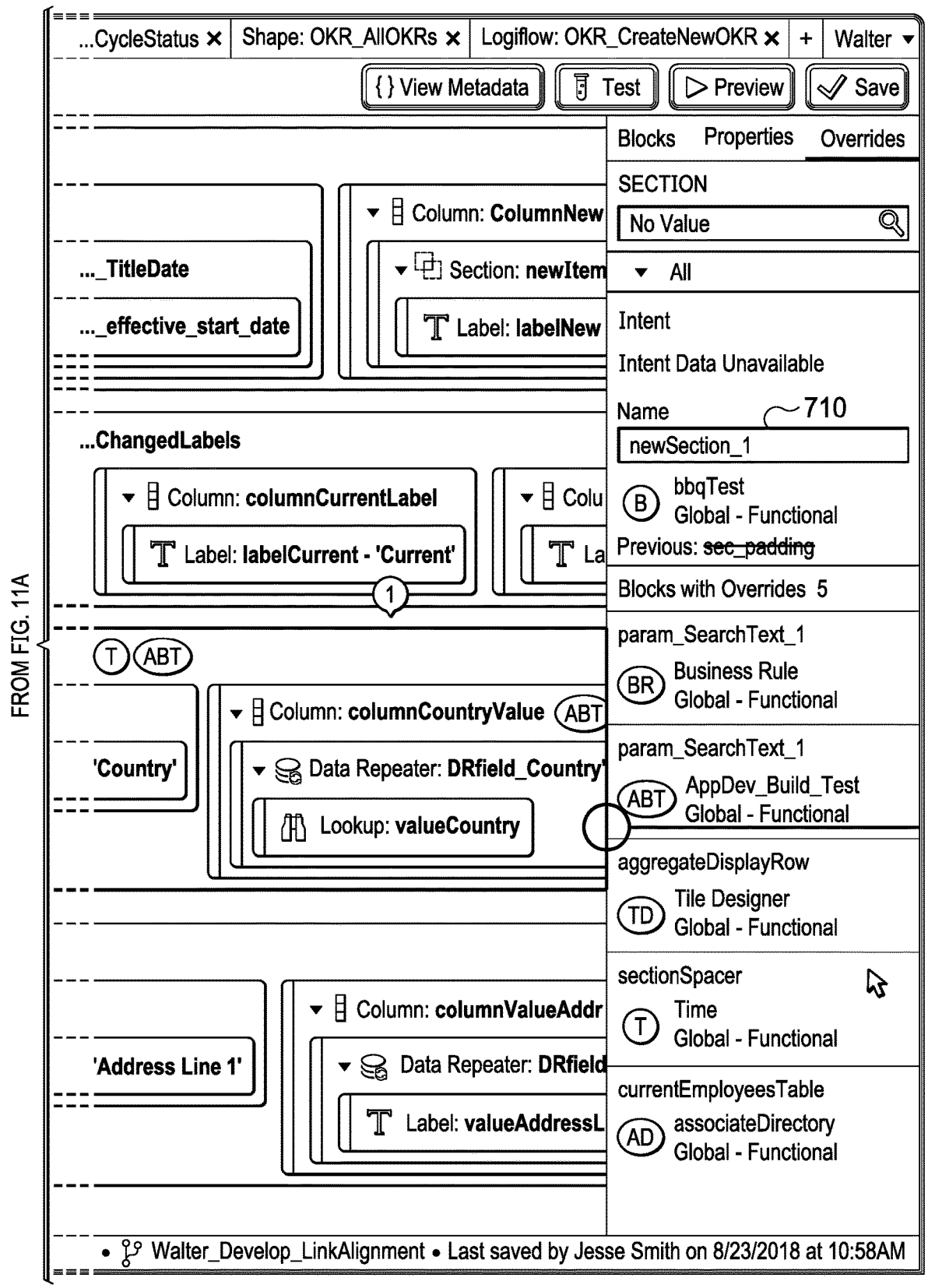

With reference next to FIG. 11, graphical user interface 700 is illustrated displaying a user interaction with and overridden block according to an illustrative example.

Responsive to user input that selects and overridden block from third area 710, graphical user interface 700 auto-scrolls second area 706 to the corresponding block. Graphical user interface 700 may additionally indicate the corresponding block in second area 706, such as by highlighting or otherwise graphically indicating the corresponding block.

Figure 12B:
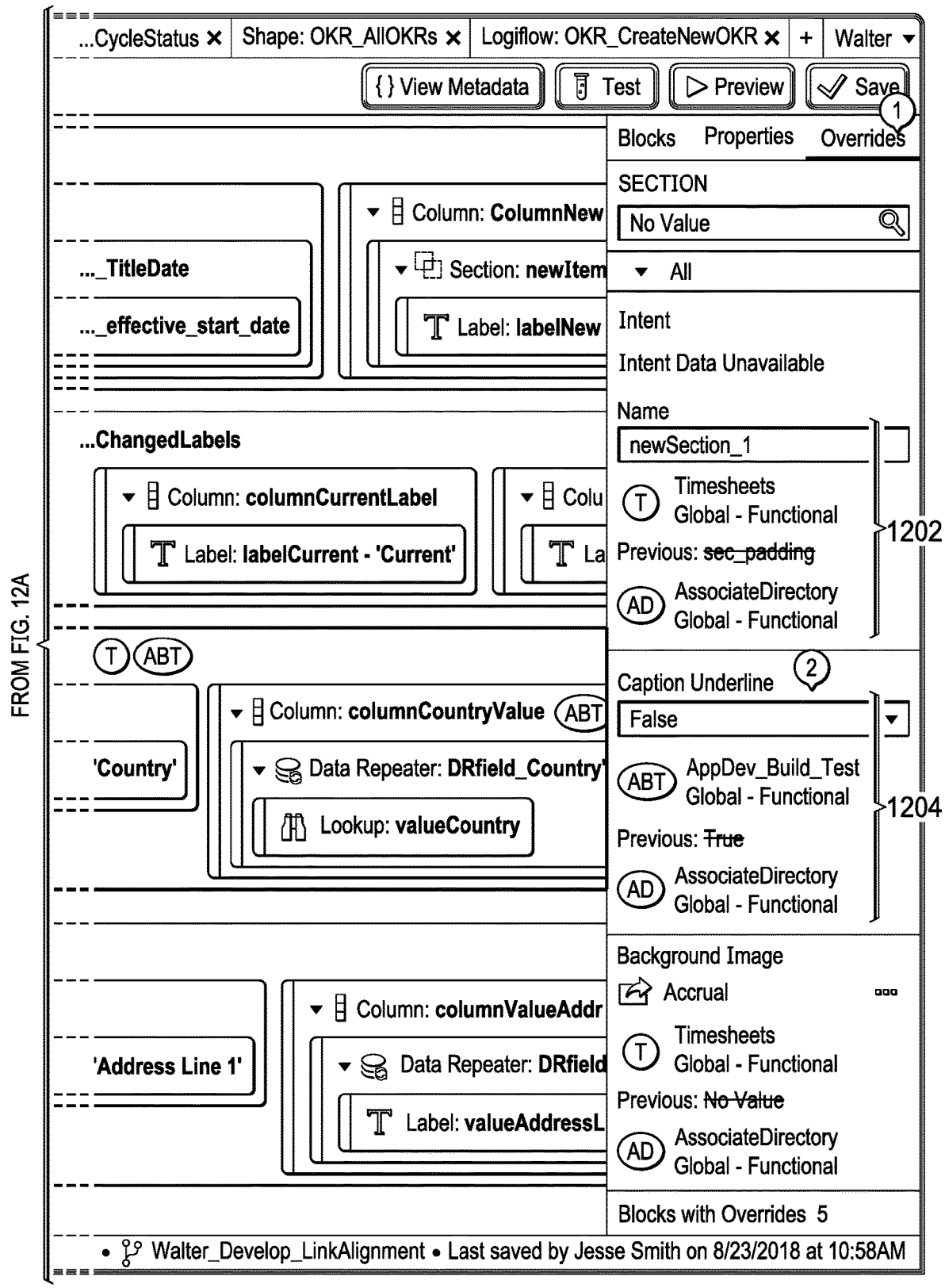

With reference next to FIG. 12, graphical user interface 700 is illustrated showing overridden properties within a selected block. Responsive to user input that selects a block from third area 710, graphical user interface 700 displays properties 1202, 1204 that are overridden inside the selected block. Properties that are overridden inside the block are listed with new values applied by the overriding tile, and previous values of the overridden tile.

With reference next to FIG. 13, graphical user interface 700 is illustrated displaying a user interaction with override toggle 1310. Override toggle 1310 is an example of override toggle 636, shown in block form in FIG. 6. Responsive to receiving user input that selects override toggle 1310, graphical user interface 700 hides the specific indicators displayed in second area 706 and third area 710. In one illustrative example, in response to a selection of an override toggle control, graphical user interface 700 the value override from the second area 706 of the graphical user interface 700. However, the selection of the override toggle 1310 does not remove the property override from the second area 706 of the graphical user interface 700.

Figure 14:
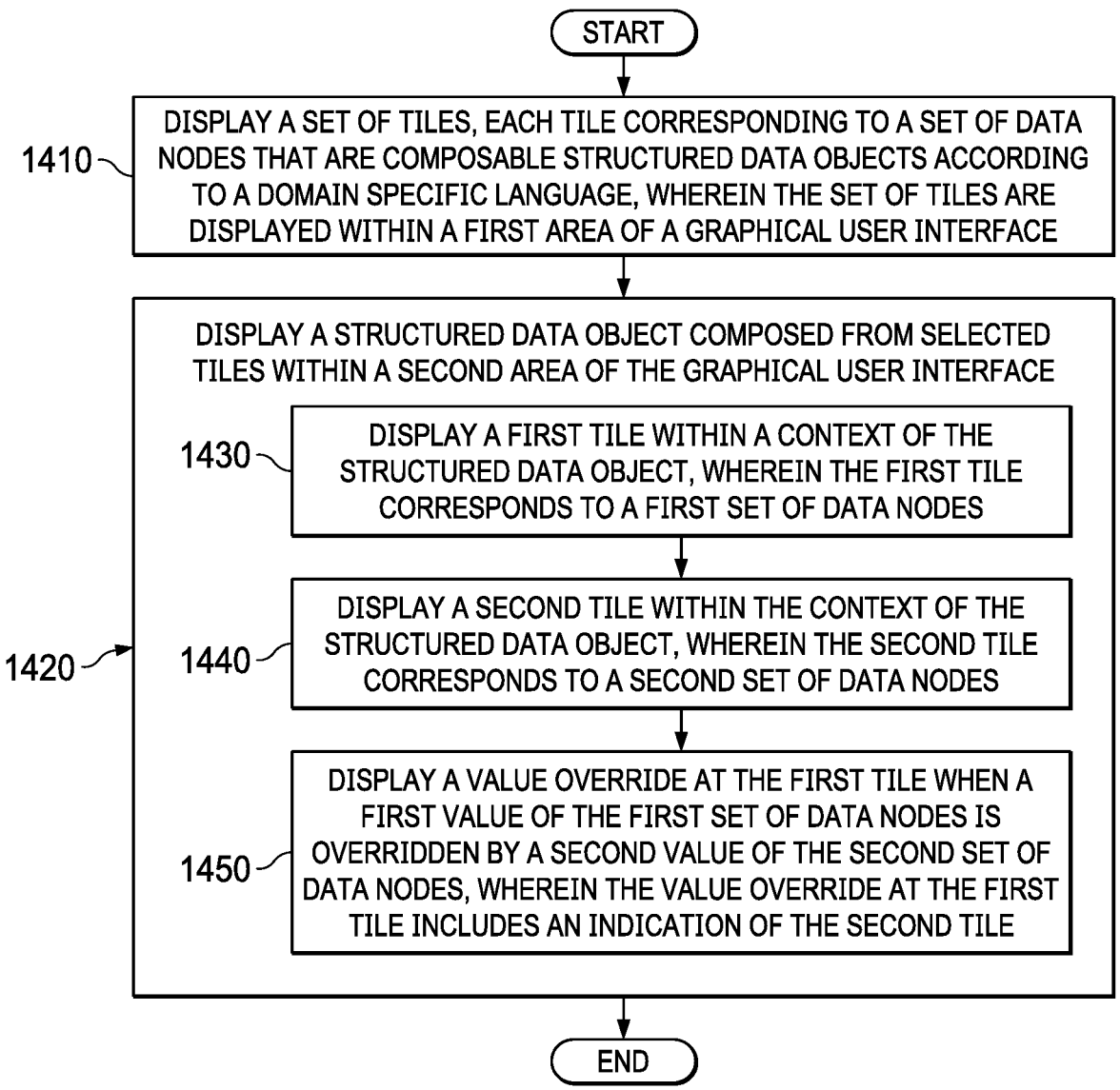
FIG. 14 is a flowchart of a method for composing a business rule according to an illustrative embodiment.

With reference next to FIG. 14, a flowchart of a method for composing a business rule is depicted according to an illustrative embodiment. Process 1400 is a software process implemented using one or more components of application development environment 600 of FIG. 6.

The process displays a set of tiles within a first area of a graphical user interface (step 1410). Each tile corresponds to a set of data nodes that are composable structured data objects according to a domain-specific language.

The process displays a structured data object within a second area of the graphical user interface (step 1420). The structured data object is composed from tiles selected from the first area of the graphical user interface.

In an illustrative example, displaying the structured data object includes displaying a first tile within a context of the structured data object (step 1430). The first tile corresponds to a first set of data nodes.

In an illustrative example, displaying the structured data object includes displaying a second tile within the context of the structured data object (step 1440). The second tile corresponds to a second set of data nodes.

In an illustrative example, displaying structured data object includes displaying a value override at the first tile when a first value of the first set of data nodes is overridden by a second value of the second set of data nodes (step 1450), with the process terminating thereafter. The value override at the first tile includes an indication of the second tile.

Figure 15:
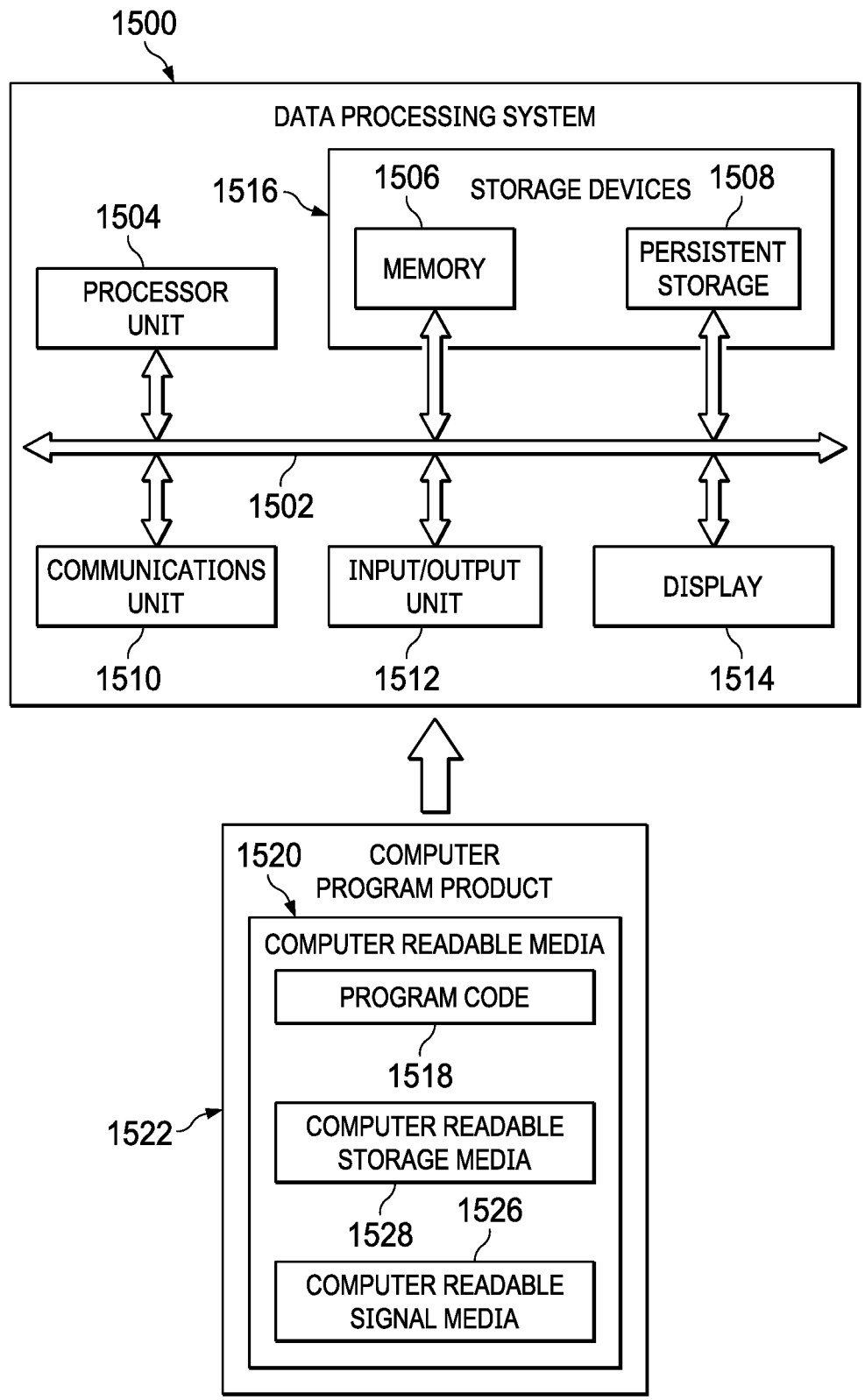
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement one or more computers, such as server computers 104, 106 and client computers 110, 112, 114 in FIG. 1.

In this illustrative example, data processing system 1500 includes communications framework 1502, which provides communications between processor unit 1504, memory 1506, persistent storage 1508, communications unit 1510, input/output unit 1512, and display 1514. In this example, communications framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation. In an embodiment, processor unit 1504 comprises at least one of a multicore processor, a central processing unit (CPU), a graphics processing unit (GPU), a physics processing unit (PPU), a digital signal processor (DSP), a network processor, or some other suitable type of processor.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508. Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer-usable program code, or computer-readable program code that may be read and executed by a processor in processor unit 1504. The program code in the different embodiments may be embodied on different physical or computer-readable storage media, such as memory 1506 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these illustrative examples. In one example, computer-readable media 1520 may be computer-readable storage media 1524 or computer-readable signal media 1526.

In these illustrative examples, computer-readable storage media 1524 is a physical or tangible storage device used to store program code 1518 rather than a medium that propagates or transmits program code 1518. Alternatively, program code 1518 may be transferred to data processing system 1500 using computer-readable signal media 1526.

Computer-readable signal media 1526 may be, for example, a propagated data signal containing program code 1518. For example, computer-readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for composing a business rule, the method comprising:
  displaying, by a computer system, a set of tiles, each tile corresponding to a set of data nodes that are composable structured data objects according to a domain-specific language, wherein the set of tiles are displayed within a first area of a graphical user interface; and
  displaying, by the computer system, a structured data object composed from selected tiles within a second area of the graphical user interface, wherein displaying the structured data object includes:
    displaying, in the second area of the graphical user interface, a first tile within a context of the structured data object, wherein the first tile corresponds to a first set of data nodes;
    displaying, in the second area of the graphical user interface, a second tile within the context of the structured data object, wherein the second tile corresponds to a second set of data nodes;
    displaying, in the second area of the graphical user interface, a value override at the first tile when a first value of the first set of data nodes is overridden by a second value of the second set of data nodes, wherein the value override at the first tile includes an indication of the second title;
    displaying the first tile in association with a first sidebar having a first color;
    displaying properties indicated by the first set of data nodes in association with sidebars having the first color;
    appending, by the second set of data nodes, additional properties to a first set of nodes;
    displaying the second tile in association with a property override, wherein the property override is a second sidebar having a second color; and
    in response to a selection of an override toggle control, removing the value override from the second area of the graphical user interface, wherein the selection of the override toggle control does not remove the property override from the second area of the graphical user interface.

2. The method of claim 1, further comprising:
  in response to a selection of a first data node in the second area of the graphical user interface, displaying, by the computer system, a set of overrides applied to the first data node, wherein the set of overrides is displayed within a third area of the graphical user interface.

3. The method of claim 2, wherein the set of overrides displayed within the third area of the graphical user interface further comprises:
  an indication of the second tile, the second value of the second set of data nodes, the indication of the first tile, and the first value of the first set of data nodes that is overridden by the second value.

4. The method of claim 3, further comprising:
  in response to the selection of an override in the third area of the graphical user interface, focusing the second area of the graphical user interface on a corresponding data node that includes the value for the override in the third area of the graphical user interface.

5. A computer system comprising:
  a hardware processor; and
  an integrated development environment in communication with the hardware processor, wherein the integrated development environment is configured:
    to display a set of tiles, each tile corresponding to a set of data nodes that are composable structured data objects according to a domain-specific language, wherein the set of tiles are displayed within a first area of a graphical user interface; and
    to display a structured data object composed from selected tiles within a second area of the graphical user interface, wherein displaying the structured data object includes:
      to display, in the second area of the graphical user interface, a first tile within a context of the structured data object, wherein the first tile corresponds to a first set of data nodes;
      to display, in the second area of the graphical user interface, a second tile within the context of the structured data object, wherein the second tile corresponds to a second set of data nodes;
      to display, in the second area of the graphical user interface, a value override at the first tile when a first value of the first set of data nodes is overridden by a second value of the second set of data nodes, wherein the value override at the first tile includes an indication of the second tile;

to display the first tile in association with a first sidebar having a first color;

to display properties indicated by the first set of data nodes in association with sidebars having the first color;

to append, by the second set of data nodes, additional properties to a first set of nodes;

to display the second tile in association with a property override, wherein the property override is a second sidebar having a second color; and in response to a selection of an override toggle control, to remove the value override from the second area of the graphical user interface, wherein the selection of the override toggle control does not remove the property override from the second area of the graphical user interface.

6. The computer system of claim 5, wherein the integrated development environment is further configured:

in response to a selection of a first data node in the second area of the graphical user interface, to display a set of overrides applied to the first data node, wherein the set of overrides is displayed within a third area of the graphical user interface.

7. The computer system of claim 6, wherein the set of overrides displayed within the third area of the graphical user interface further comprises:

an indication of the second tile, the second value of the second set of data nodes, the indication of the first tile, and the first value of the first set of data nodes that is overridden by the second value.

8. The computer system of claim 7, wherein, the integrated development environment is further configured:

in response to a selection of an override in the third area of the graphical user interface, to focus the second area of the graphical user interface on a corresponding data node that includes a selected override value.

9. A computer program product for composing a business rule, the computer program product comprising:

a non-transitory computer readable storage media;

program code, stored on the computer readable storage media, for displaying a set of tiles, each tile corresponding to a set of data nodes that are composable structured data objects according to a domain-specific language, wherein the set of tiles are displayed within a first area of a graphical user interface; and program code, stored on the computer readable storage media, for displaying a structured data object composed from selected tiles within a second area of the graphical user interface, wherein displaying the structured data object includes:

displaying, in the second area of the graphical user interface, a first tile within a context of the structured data object, wherein the first tile corresponds to a first set of data nodes;

displaying, in the second area of the graphical user interface, a second tile within the context of the structured data object, wherein the second tile corresponds to a second set of data nodes;

displaying, in the second area of the graphical user interface, a value override at the first tile when a first value of the first set of data nodes is overridden by a second value of the second set of data nodes, wherein the value override at the first tile includes an indication of the second title;

displaying the first tile in association with a first sidebar having a first color;

displaying properties indicated by the first set of data nodes in association with sidebars having the first color appending, by the second set of data nodes, additional properties to a first set of nodes;

displaying the second tile in association with a property override, wherein the property override is a second sidebar having a second color; and removing the value override from the second area of the graphical user interface in response to a selection of an override toggle control, wherein the selection of the override toggle control does not remove the property override from the second area of the graphical user interface.

10. The computer program product of claim 9, further comprising:

program code, stored on the computer readable storage media, for displaying a set of overrides applied to a first data node in response to a selection of the first data node in the second area of the graphical user interface, wherein the set of overrides is displayed within a third area of the graphical user interface.

11. The computer program product of claim 10, wherein the set of overrides displayed within the third area of the graphical user interface further comprises:

an indication of the second tile, the second value of the second set of data nodes, an indication of the first tile, and the first value of the first set of data nodes that is overridden by the second value.

12. The computer program product of claim 11, further comprising:

program code, stored on the computer readable storage media, for focusing the second area of the graphical user interface on a corresponding data node that includes a selected override value in response to a selection of an override in the third area of the graphical user interface.

* * * * *